R. E. HELLMUND.
CONTROL SYSTEM.
APPLICATION FILED JAN. 6, 1915.
1,257,349. Patented Feb. 26, 1918.
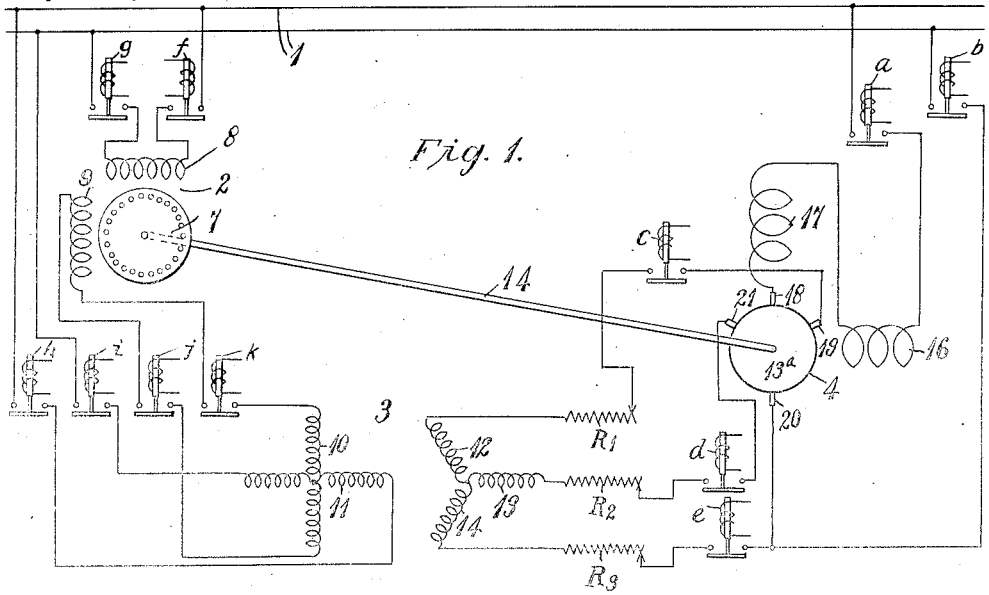
Fig. 1.
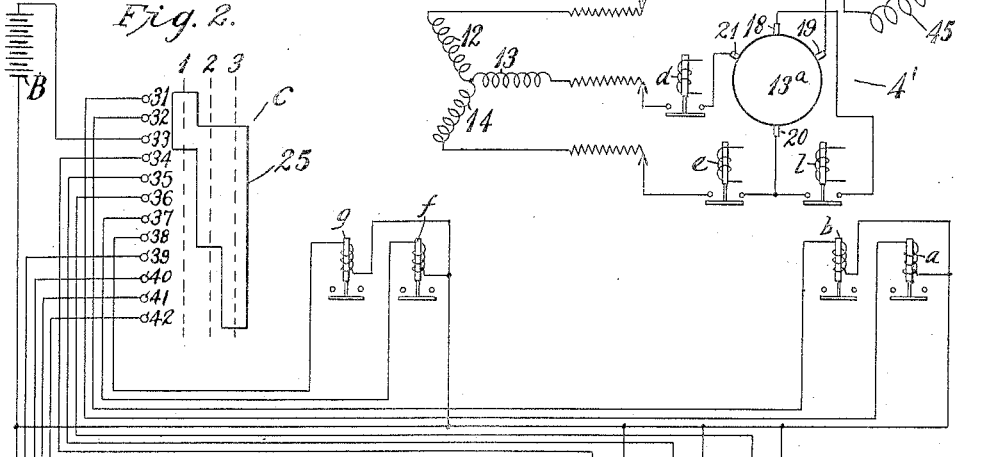
Fig. 2.
Fig. 4.
Fig. 3.
WITNESSES:
Fred H. Miller
D. H. Mace
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,257,349.     Specification of Letters Patent.     Patented Feb. 26, 1918.

Application filed January 6, 1915. Serial No. 794.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to control systems, and it has special reference to alternating current systems in which polyphase induction motors are supplied with energy through the agency of a so-called phase converter.

One of the objects of my invention is to provide a system of the above-indicated type embodying an auxiliary dynamo-electric machine which shall be mechanically associated with the rotating member of the phase converter and adapted to bring it up to its synchronous speed after which said machine is electrically connected to the secondary member of the induction motor and serves to regulate the power factor thereof.

More specifically, it is an object of my invention to utilize a single-phase commutator motor for starting a phase converter and to subsequently modify the connections of said motor and employ it in connection with the secondary member of an induction motor as a power-factor regulator of the so-called Leblanc exciter type.

In my co-pending application, Serial No. 819,739, filed February 19, 1914, I have disclosed a system in which a single-phase single commutator motor is employed in connection with a phase converter for bringing it up to speed, after which, the armature and main field windings of the motor are respectively connected in circuit with the corresponding phase-windings of the converter and of the associated induction driving motor in such manner that automatic regulation of the amount and phase position of the phase-converter voltage is inherently accomplished under varying load conditions.

Furthermore, it is old in the art to employ a so-called Leblanc exciter which comprises a wound armature and an unwound magnetizable field structure, in connection with the secondary member of a polyphase induction motor for the purpose of inherently maintaining and regulating the power factor thereof.

According to my invention, I propose to provide a simplified and improved means for starting a phase converter and for subsequently regulating the operation of the driving motor which receives energy therefrom.

In the accompanying drawing, Figure 1 is a diagrammatic view of the main circuit connections of a system of control embodying my invention; Fig. 2 is a diagrammatic view of the auxiliary control-circuit connections which are adapted for governing the operation of the apparatus shown in Fig. 1; Fig. 3 is a sequence chart showing the positions of the several switches in the various positions of the controller, and Fig. 4 is a view, similar to Fig. 1, of a portion of a system embodying a slightly modified form of my invention.

Referring to Fig. 1 of the drawing, the system shown embodies the source of single-phase alternating current energy 1, a phase converter 2, a driving motor 3, an auxiliary starting and regulating machine 4, a plurality of accelerating resistors $R^1$, $R^2$, and $R^3$, and a plurality of electrically operated switches $a$ to $k$, inclusive.

The phase converter 2 may constitute a two-phase induction motor of the squirrel-cage type having a rotor 7, a primary exciting winding 8 and a secondary winding 9; the latter two windings being electromagnetically associated in quadrature relation in the usual manner, whereby the voltage induced in the secondary winding 9 is substantially in quadrature with that of the primary or exciting winding 8.

The driving motor 3 is of the polyphase induction type and comprises two-phase primary windings 10 and 11 and three-phase secondary windings 12, 13 and 14. The motor 3 is merely representative of any polyphase induction motor, and the number of phases of either the primary or secondary windings is unessential and may be as desired. The secondary windings of the motor 3 are respectively connected to the adjustable accelerating resistors $R^1$, $R^2$ and $R^3$ by means of which the acceleration of the motor 3 is governed in accordance with well known practice.

The auxiliary starting and regulating machine 4 comprises essentially an armature $13^a$ that is preferably mounted upon a shaft 14 which also carries the phase-converter rotor 7 or is otherwise mechanically associated therewith and also embodies a main exciting winding 16 and an auxiliary compensating winding 17 that are suitably disposed upon a magnetizable core structure (not shown) in a manner familiar in the art. The armature 13ª of the machine 4 is of the commutator type and is provided with a plurality of brushes 18, 19, 20 and 21. When the machine 4 is employed as a motor for starting up the converter 2, the windings 16 and 17 are connected in series relation with the brushes 18 and 20, across the source of energy 1 by means of the electrically operated switches $a$ and $b$, while, after the converter has been brought up to synchronous speed, the switches $a$ and $b$ are opened to disconnect the machine 4 from the source of energy, and the brushes 19, 20 and 21 are electrically connected to the secondary windings 12, 14 and 13, respectively, of the driving motor 3. The brushes 19, 20 and 21 are located, with respect to the commutator of the machine 4, in such manner that balanced polyphase voltages are produced in accordance with the well-known principle of the Leblanc exciter, and said voltages, when superimposed upon the induced voltages of the secondary windings 12, 13 and 14 of the driving motor 3, serve to automatically regulate and maintain the power factor of the driving motor.

The primary winding 11 of the driving motor 3 receives energy directly from the single-phase source 1 through switches $h$ and $i$, while the primary winding 10 of said motor is supplied with energy through switches $j$ and $k$ from the converter secondary winding 9. The converter primary winding 8 is excited directly from the single-phase source of energy 1 when connected thereto by means of switches $f$ and $g$.

Referring now to Fig. 2, the several electrically operated switches $a$ to $k$, inclusive, are adapted to be governed through the agency of a controller C which comprises a movable conducting segment 25 and a plurality of stationary contact terminals 31 to 42, inclusive, which are adapted to make co-operative engagement therewith upon the position-indicating lines, 1, 2 and 3.

Having described, in a general way, the various pieces of apparatus, the operation of the system will now be set forth. Assuming the apparatus and the circuit connections to be as shown, the operation is as follows:

The controller C is first moved into position 1, thereby completing a circuit from one side of a source of energy or battery B, which includes terminal 33 and conducting segment 25 and thence in a divided circuit, one branch of which includes terminal 31 and energizing coil of switch $a$ to the other side of the battery, and the other branch of which includes terminal 32 and energizing coil of switch $b$ to the battery. Switches $a$ and $b$, being thus energized, are closed to connect the auxiliary machine 4, as a series commutator motor, to the source of energy 1, whereby said machine acts as a motor to bring the rotor 7 of the phase converter 2 up to synchronous speed.

When synchronous speed is attained, the controller C is moved into position 2, which movement deënergizes switches $a$ and $b$ and disconnects the field windings 16 and 17 of the machine 4 from the source of energy. Concurrently therewith, however, contact terminals 34, 35, 36, 37 and 38 are brought into contact with the segment 25 and, hence, the respective electrically operated switches $c$, $d$, $e$, $f$ and $g$ are energized and closed. Thus, the armature 13 of the auxiliary machine 4 is connected to the respective secondary windings of the driving motor 3, and the primary winding 8 of the converter 2 is connected to the source of energy 1 and is excited therefrom. Inasmuch as the windings 16 and 17 of the machine 4 are disconnected from the source, said machine operates as a generator without field-winding excitation, in the manner of the well-known forms of Leblanc exciters, and thus is adapted to perform its intended purpose of power-factor regulation.

Having brought the converter 2 up to speed and connected its exciting winding 8 to the source, the controller C may be moved into position 3, whereby terminals 39, 40, 41 and 42 are brought into contact with the conducting segment 25, whence, the energizing coils of switches $h$, $i$, $j$ and $k$ are energized. Said switches are, therefore, closed to connect the primary motor windings 10 and 11, respectively, to the secondary converter winding 9 and to the source of energy 1.

Thus, polyphase energy is supplied to the driving motor 3, and the acceleration thereof may be effected by suitable adjustments of the accelerating resistors $R^1$, $R^2$ and $R^3$, while the machine 4 automatically maintains the power factor of the driving motor.

Reference may now be had to Fig. 4, in which is shown a portion of a system of control embodying a modified form of my invention, the distinction residing in the fact that the auxiliary machine 4 is provided with a single winding 45 which is adapted to be connected to the source of energy 1 by switches $a'$ and $b'$; while the brushes 18 and 20 of the armature 13 are adapted to be short-circuited through an electrically operated switch $l$, whereby the machine acts as a repulsion motor during the starting period and is subsequently connected to the secondary windings 12, 13 and 14 of the motor 3, in the manner already set forth for the purpose of power-factor regulation.

Various modifications in the structural details and arrangement and location of parts and circuit connections may be effected without departing from the spirit and scope of my invention, and such modifications are intended to be covered by the appended claims.

I claim as my invention:

1. The combination with a source of energy, a phase converter, and an induction motor connected to receive energy through said phase converter and having a phase-wound secondary winding, of an auxiliary dynamo-electric machine mechanically associated with said phase converter for starting said converter, and means for electrically connecting said machine to the phase-wound secondary of said induction motor.

2. The combination with a source of energy, a phase converter, and an induction motor connected to receive energy through said phase converter and having a phase-wound secondary winding, of a dimorphous dynamo-electric machine capable of operation either as a single-phase commutator motor or as a polyphase phase-advancer, means for connecting said machine as a motor for starting said phase converter and alternative means for electrically connecting said machine to the phase-wound secondary member of said induction motor as a phase-advancer for power-factor regulation.

3. In a control system, the combination with a source of energy, a phase converter connected thereto, and a polyphase induction driving motor connected to receive energy from said phase converter and having a wound secondary member, of an auxiliary dynamo-electric machine mechanically associated with said phase converter, and means for connecting said machine to said source of energy for starting said phase converter and for subsequently connecting said machine to the wound secondary member of said driving motor for regulating the power factor thereof.

4. In a control system, the combination with a source of energy, a phase converter connected thereto, and a polyphase induction driving motor connected to receive energy from said phase converter and having a wound secondary member, of an auxiliary dynamo-electric machine mechanically associated with said phase converter and initially connected to operate as a single-phase commutator motor for starting said converter, and means for electrically connecting the armature of said machine to the wound secondary member of said driving motor.

5. In a control system, the combination with a source of energy, a phase converter connected thereto, and a polyphase induction driving motor connected to receive energy from said phase converter and having a wound secondary member, of an auxiliary dynamo-electric machine mechanically associated with said phase converter and comprising an armature, a commutator and field-magnet windings, and means for connecting said machine to said source to operate as a single-phase motor for starting said phase converter and for subsequently disconnecting said machine from said source and connecting its armature only to the wound secondary member of said driving motor to supply polyphase energy thereto for regulating the power factor of said motor.

6. The combination with a source of energy, a phase converter connected thereto, and a polyphase motor receiving energy therefrom and having a wound secondary member, of means for starting said phase converter and for subsequently directly influencing the electrical characteristics of said motor secondary member.

7. The combination with a source of energy, a phase converter connected thereto, and a polyphase motor receiving energy therefrom and having a wound secondary member, of electrical means adapted to start said phase converter and subsequently to be connected to the wound secondary member of said motor for effecting power-factor compensations.

8. The combination with a single-phase source of energy, a phase converter connected thereto, and a polyphase induction motor receiving energy from said phase converter and having a phase-wound secondary member, of a single phase commutator motor initially connected to said source for mechanically bringing said phase converter up to speed, and means for disconnecting said motor from said source to permit operation as a generator without field winding excitation and connecting its armature to said phase-wound secondary motor member to supply polyphase compensating energy thereto for regulating the power factor of said motor.

9. The combination with a source of energy, phase-converting means connected thereto, and a polyphase dynamo-electric machine receiving energy therefrom, of auxiliary means initially adapted to mechanically drive said phase-converting means and subsequently adapted to directly influence predetermined electrical characteristics of said polyphase machine.

10. The combination with a source of energy, phase-converting means connected thereto, and a polyphase dynamo-electric machine receiving energy therefrom, of means for starting said phase converter and regulating the power factor for said polyphase machine, comprising an auxiliary dynamo-electric machine adapted to initially operate as a motor and subsequently as a power-factor regulator.

11. The combination with a source of energy, phase-converting means connected thereto, and a polyphase dynamo-electric machine receiving energy therefrom, and from said source, of means for starting said phase-converter and regulating the power factor for said polyphase machine comprising an auxiliary dynamo-electric machine adapted to respectively drive said phase-converter and to electrically regulate said polyphase machine during different operating periods.

12. The combination with a source of energy, phase-converting means connected thereto, and a polyphase dynamo-electric machine receiving energy therefrom, and from said source, of means for starting said phase-converter and for regulating the power-factor for said polyphase machine comprising an auxiliary dynamo-electric machine adapted to drive said phase-converter and to electrically regulate said polyphase machine during starting and full-speed conditions of said phase-converting means respectively.

In testimony whereof, I have hereunto subscribed my name this 31st day of Dec., 1914.

RUDOLF E. HELLMUND.

Witnesses:
A. L. BROOMALL,
B. B. HINES.